United States Patent
Pardue

(10) Patent No.: US 11,226,229 B2
(45) Date of Patent: Jan. 18, 2022

(54) VIBRATION SENSOR MOUNTING STRUCTURE

(71) Applicant: Computational Systems, Inc., Knoxville, TN (US)

(72) Inventor: Bradley D. Pardue, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 81 days.

(21) Appl. No.: 16/782,764

(22) Filed: Feb. 5, 2020

(65) Prior Publication Data

US 2021/0131860 A1    May 6, 2021

Related U.S. Application Data

(60) Provisional application No. 62/931,247, filed on Nov. 6, 2019.

(51) Int. Cl.
*G01H 1/00* (2006.01)
*G01M 13/00* (2019.01)

(52) U.S. Cl.
CPC .............. *G01H 1/00* (2013.01); *G01M 13/00* (2013.01)

(58) Field of Classification Search
CPC .................................. G01H 1/00; G01M 13/00
See application file for complete search history.

(56) References Cited

U.S. PATENT DOCUMENTS

| | | | |
|---|---|---|---|
| 4,374,472 A * | 2/1983 | Nishimura | G01H 11/08 73/35.11 |
| 4,951,526 A * | 8/1990 | Linder | G01M 1/36 451/343 |
| 5,939,616 A * | 8/1999 | Ito | G01L 23/222 73/35.11 |
| 8,640,545 B2 | 2/2014 | Zusman et al. | |
| 8,700,353 B2 | 4/2014 | Khazanov | |
| 9,284,987 B2 | 3/2016 | Murphy | |
| 9,453,854 B2 | 9/2016 | Kraige et al. | |
| 9,578,398 B2 | 2/2017 | Svoen et al. | |
| 9,778,146 B2 | 10/2017 | Biegner et al. | |
| 9,791,310 B2 | 10/2017 | Girardeau | |
| 9,921,136 B2 | 3/2018 | Wascat et al. | |
| 10,422,667 B2 | 9/2019 | Decook et al. | |
| 2002/0054719 A1 * | 5/2002 | Takizawa | F16C 19/527 384/448 |
| 2009/0315544 A1 * | 12/2009 | Takahashi | G01P 13/04 324/207.25 |

(Continued)

*Primary Examiner* — Alexander Satanovsky
*Assistant Examiner* — Lyudmila Zaykova-Feldman
(74) *Attorney, Agent, or Firm* — Luedeka Neely Group, PC

(57) ABSTRACT

A vibration sensor mounting structure improves the stability and repeatability of a measured signal generated by a machine vibration sensor. The structure has an outer annular surface that contacts the machine under test and a shallow recess inside the outer annular surface. The recess causes resonant vibrations of the mounting structure to occur at frequencies that are above the intended measurement range of the sensor. The recess also allows the mounting force to be positioned away from the center mounting screw and onto the more stable outer annular surface. With the mounting force away from the center, lateral forces have less effect on the measured signal.

21 Claims, 2 Drawing Sheets

(56) References Cited

U.S. PATENT DOCUMENTS

| | | | |
|---|---|---|---|
| 2011/0203367 A1* | 8/2011 | Huang | G01N 33/4905 |
| | | | 73/32 R |
| 2015/0355216 A1* | 12/2015 | Girardeau | G01H 1/00 |
| | | | 73/514.29 |
| 2017/0248451 A1 | 8/2017 | Ginet et al. | |
| 2017/0276177 A1* | 9/2017 | Nozaki | G01M 13/04 |
| 2018/0292243 A1* | 10/2018 | DeCook | G01D 11/305 |
| 2019/0178689 A1 | 6/2019 | DeCook | |
| 2019/0285513 A1* | 9/2019 | Cheve | G01M 7/00 |

* cited by examiner

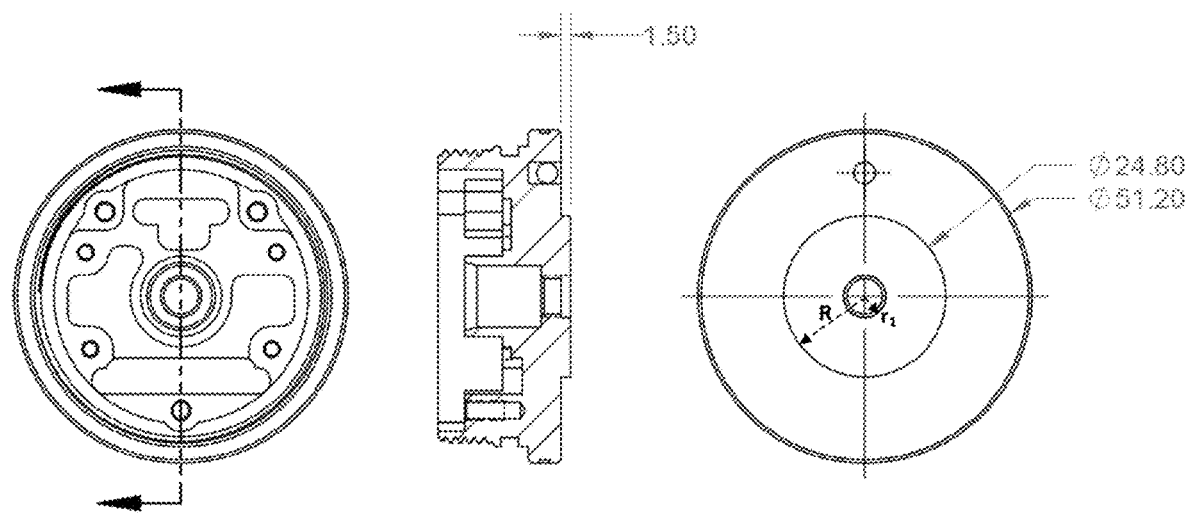
FIG. 1
(Prior Art)
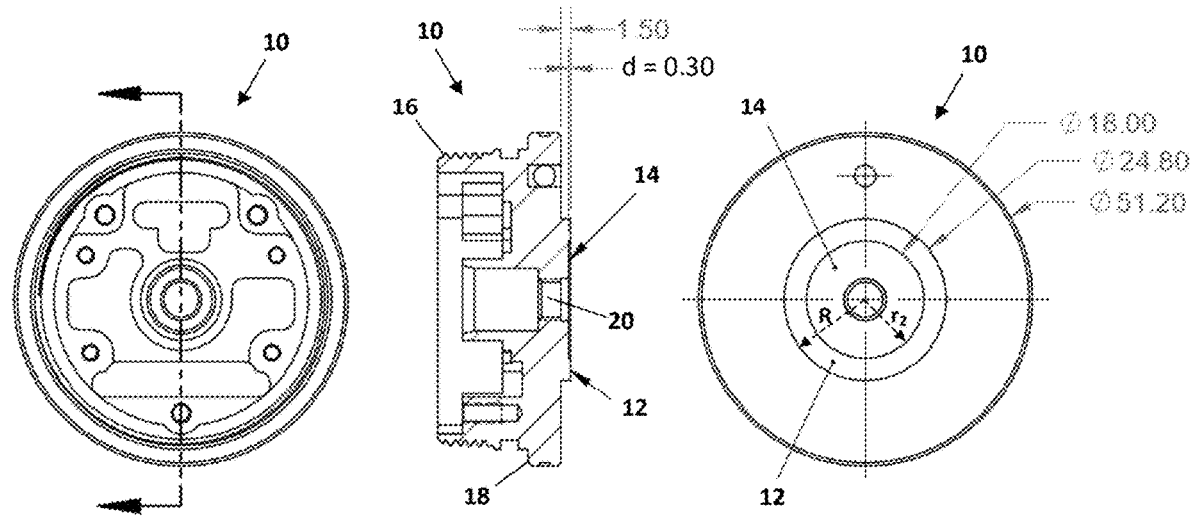
FIG. 2A  FIG. 2B  FIG. 2C

VIBRATION SENSOR MOUNTING STRUCTURE

RELATED APPLICATIONS

This application claims priority to U.S. provisional patent application Ser. No. 62/931,247, titled STRUCTURE FOR PROVIDING SENSOR MOUNTING STABILITY AND RESONANT FREQUENCY ADJUSTMENT, filed Nov. 6, 2019, the entire contents of which are incorporated herein by reference.

FIELD

Embodiments of the invention described herein relate to the field of machine vibration sensing and monitoring. More particularly, the embodiments relate to a structure for securely and stably mounting a vibration sensor to a machine surface, and for adjusting the resonance frequency of the structure based at least in part on contact surface area and geometry.

BACKGROUND

Generally, a high quality vibration sensor should have a high frequency response. It is also important that any resonance vibration of the sensor structure should occur at a frequency that is outside the desired frequency range in which the sensor is to collect data, and the frequency response of the sensor should be repeatable from unit to unit.

What is needed, therefore, is a sensor mounting structure that is secure and stable, which has a known and repeatable area of contact with the surface of the machine.

SUMMARY

The above and other needs are met by a vibration sensor mounting structure having a shallow recess in the central area of the structure's surface that contacts a machine under test, which structure improves the stability and repeatability of a measured signal generated by the vibration sensor. The recess causes resonant vibrations of the mounting structure to occur at frequencies that are above the intended measurement range of the sensor. The recess also allows the mounting force to be positioned away from the center mounting screw and onto a more stable outer annular surface. With the mounting force disposed away from the center, lateral forces have less effect on the measured signal.

In some preferred embodiments, the vibration sensor mounting structure includes a sensor attachment portion for receiving and securely holding the vibration sensor and a base portion that is rigidly connected to the sensor attachment portion. The base portion includes an annular mounting surface and a central recessed surface. The annular mounting surface is configured to contact the surface of the machine, and has an outer radius R and an inner radius r. The central recessed surface, which is surrounded by the annular mounting surface, is configured not to contact the surface of the machine. The values of the inner radius r and the outer radius R are selected to have a predetermined effect on a resonant frequency response of the mounting structure.

In some embodiments, the values of the inner radius r and the outer radius R are selected to cause the resonant frequency response of the mounting structure to be outside a range of measurement frequencies in which the vibration sensor is used to measure vibration of the machine.

In some embodiments, the inner radius r is greater than or equal to 71% of the outer radius R and less than or equal to 75% of the outer radius R.

In some embodiments, the vibration sensor is used in measuring vibration of the machine at measurement frequencies within a range of 1 Hz to 10 KHz, and the vibration sensor has a mass ranging from about 0.65 pounds to about 0.75 pounds, and the outer radius R ranges from 12.3 mm to 12.5 mm and the inner radius r ranges from 8.9 mm to 9.1 mm.

In some embodiments, the outer radius R is 12.4 mm and the inner radius r is 9.0 mm.

In some embodiments, the sensor attachment portion and the base portion are integrally formed as one continuous structure.

Some embodiments include a central hole through the base portion for receiving a bolt or stud for attaching the mounting structure to the surface of the machine.

In some embodiments, the central hole has a radius that is less than the inner radius r of the annular mounting surface.

In some embodiments, the annular mounting surface is substantially flat.

In some embodiments, the annular mounting surface is defined as a portion of a surface of a toroid.

In some embodiments, the central recessed surface is recessed to a depth ranging from 0.2 mm to 0.4 mm in relation to the annular mounting surface.

In some embodiments, the central recessed surface is recessed to a depth of 0.3 mm in relation to the annular mounting surface.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIG. 1 depicts a prior art sensor mounting structure;

FIG. 2A is a top plan view of a sensor mounting structure according to one embodiment;

FIG. 2B is a cross section view of the sensor mounting structure depicted in FIG. 2A;

FIG. 2C is a bottom plan view of the sensor mounting structure depicted in FIGS. 2A and 2B.

DETAILED DESCRIPTION

Figure 3:
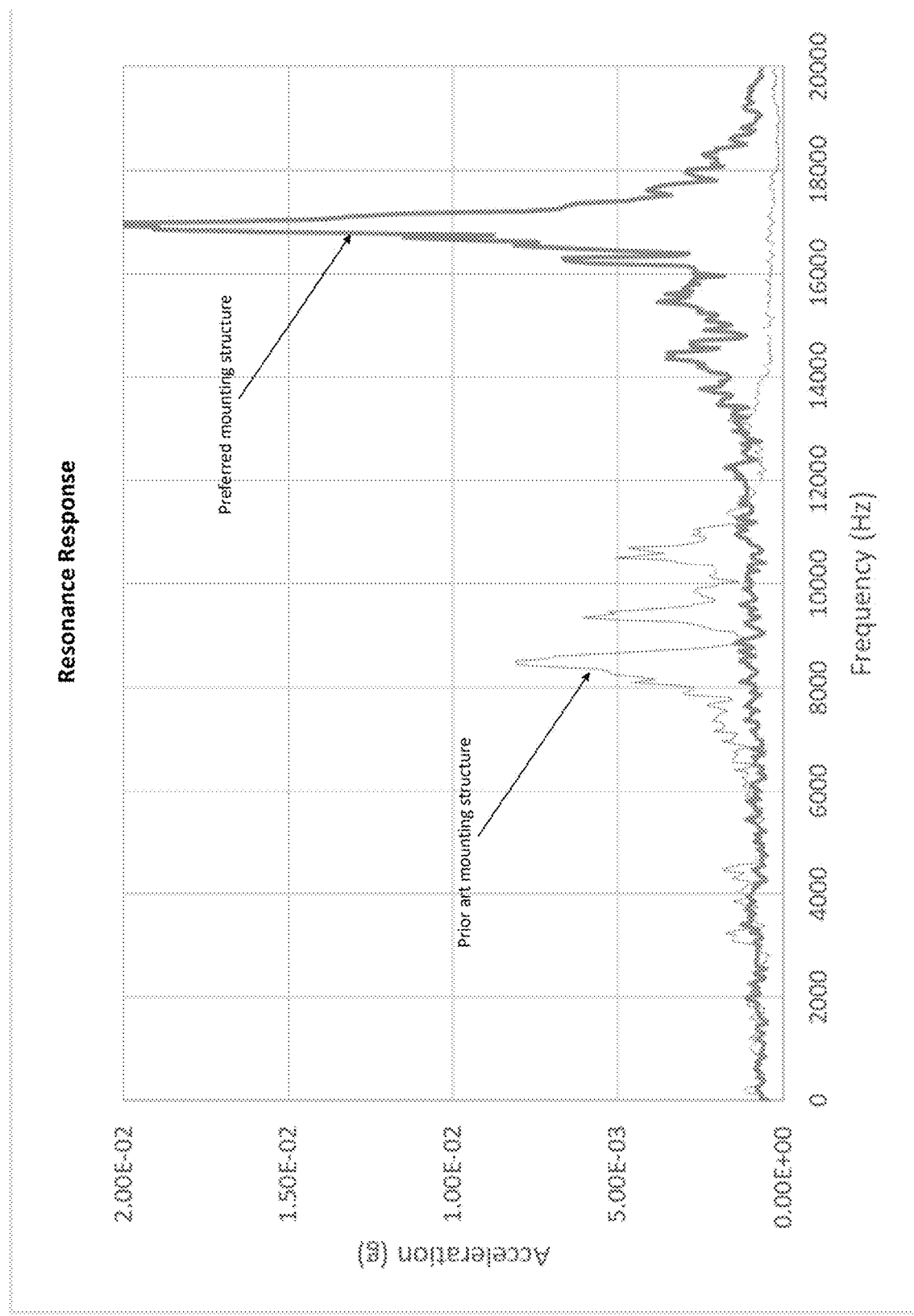
FIG. 3 depicts a spectral graph of the frequency responses of the mounting structures depicted in FIGS. 1 and 2A-2C.

As shown in FIG. 1, a prior art sensor mounting structure has a generally flat circular surface around a central hole that receives a threaded mounting bolt/stud. In the depicted example of the prior art structure, the outer diameter of the mounting surface is about 24.8 mm and the diameter of the central hole is about 6.5 mm. With this configuration, the mounting surface of the prior art structure is an annulus having an area $A_1$ expressed as:

$$A_1 = \pi(R^2 - r_1^2),$$

where R is the outer radius and $r_1$ is the inner radius of the annulus. In the prior art structure, R is 12.4 mm and $r_1$ is 3.25 mm, resulting in an area $A_1$ of about 449.86 $mm^2$.

As shown in FIGS. 2A, 2B, and 2C, a preferred sensor mounting structure 10 includes a substantially circular sensor attachment portion 16 and a substantially circular base portion 18 that are preferably integrally formed from a single piece of metal. The sensor attachment portion 16 may include outer threads that receive the inner threads of a cylindrical sensor housing that screws onto the sensor mounting structure 10. In a preferred embodiment, the base portion 18 has a central hole 20 that receives a threaded mounting bolt/stud for attaching the structure 10 to a surface of a machine.

The base portion 18 preferably includes an annular mounting surface 12 that contacts the surface of the machine. The mounting surface 12 surrounds a central circular recessed area 14 that preferably does not contact the surface of the machine. In a preferred embodiment the recessed area 14 has a depth d of about 0.3 mm in relation to the surface 12. The diameter of the recessed area 14 of the embodiment depicted in FIGS. 2A-2C is about 18.0 mm. Thus, the mounting surface 12 of the embodiment depicted in FIGS. 2A-2C is an annulus having an area $A_2$ expressed as:

$$A_2 = \pi(R^2 - r_2^2),$$

where R is 12.4 mm and $r_2$ is 9.0 mm, resulting in an area $A_2$ of 228.58 mm$^2$.

FIG. 3 depicts vibration levels of a machine as measured by a sensor attached to the machine using the prior art mounting structure depicted in FIG. 1 compared to vibration levels measured by the same sensor attached to the same machine using the preferred mounting structure 10 depicted in FIGS. 2A-2C. As shown in FIG. 3, the vibration levels measured with the prior art sensor mounting structure exhibit resonant peaks near 8500 Hz, 9400 Hz, and 10,600 Hz. Because the energy associated with these peaks falls within the desired sensor measurement range of 1 Hz to 10 KHz, they introduce undesired interference with the collection of vibration data on the machine under test. On the other hand, the resonance response of the mounting structure 10 depicted in FIGS. 2A-2C exhibits a distinct peak at about 17 KHz, which is well outside the desired sensor measurement range.

It will be appreciated that the annular mounting surface 12 depicted in FIGS. 2A-2C is just one example of a preferred structure. Other embodiments of sensor mounting structures may have other values for the outer radius R and the inner radius $r_2$. These dimensions may vary for various sensors depending on the sensor mass, the sensor natural resonant frequency, and the expected frequency range of operation of the machine under test. Generally, the values of R and $r_2$ should be as large as is practical to improve the overall stability of the structure.

It will be appreciated that embodiments of the invention provide a secure and stable sensor mounting structure that precludes detection of undesired motion and vibration of the mounting structure by the sensor. Due to the circular recess 14 at the center of the base of the mounting structure, mounting forces are transferred to the outer annular surface 12. In this configuration, the sensor is less likely to be affected by lateral forces or by a soft mounting situation due to manufacturing irregularities and tolerances.

In preferred embodiments, the annular mounting surface 12 is substantially flat to within ±0.01 mm. However, in alternative embodiments, the annular mounting surface 12 is defined as a portion of a surface of a toroid, in which case the points at which the toroidal surface makes contact with the surface of the machine substantially define a circle.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A mounting structure for contacting a surface of a machine and holding a vibration sensor in relationship to the machine as vibration of the machine is measured by the vibration sensor, the mounting structure comprising:
    a sensor attachment portion for receiving and securely holding the vibration sensor;
    a base portion rigidly connected to the sensor attachment portion, the base portion comprising:
        an annular mounting surface configured to contact the surface of the machine, the annular mounting surface having an outer radius R and an inner radius r; and
        a central recessed surface surrounded by the annular mounting surface, the central recessed surface configured not to contact the surface of the machine,
    wherein values of the inner radius r and the outer radius R are selected to have a predetermined effect on a resonant frequency response of the mounting structure,
    wherein the vibration sensor is for use in measuring vibration of the machine at measurement frequencies within a range of 1 Hz to 10 KHz,
    wherein the vibration sensor has a mass ranging from about 0.65 pounds to about 0.75 pounds, and
    wherein the outer radius R ranges from 12.3 mm to 12.5 mm and the inner radius r ranges from 8.9 mm to 9.1 mm.

2. The mounting structure of claim 1 wherein the values of the inner radius r and the outer radius R are selected to cause the resonant frequency response of the mounting structure to be outside a range of measurement frequencies in which the vibration sensor is used to measure vibration of the machine.

3. The mounting structure of claim 1 wherein the outer radius R is 12.4 mm and the inner radius r is 9.0 mm.

4. The mounting structure of claim 1 wherein the sensor attachment portion and the base portion are integrally formed as one continuous structure.

5. The mounting structure of claim 1 further comprising a central hole through the base portion for receiving a bolt or stud for attaching the mounting structure to the surface of the machine.

6. The mounting structure of claim 5 wherein the central hole has a radius that is less than the inner radius r of the annular mounting surface.

7. The mounting structure of claim 1 wherein the annular mounting surface is substantially flat.

8. The mounting structure of claim 1 wherein the annular mounting surface is defined as a portion of a surface of a toroid.

9. The mounting structure of claim 1 wherein the central recessed surface is recessed to a depth ranging from 0.2 mm to 0.4 mm in relation to the annular mounting surface.

10. The mounting structure of claim 1 wherein the central recessed surface is recessed to a depth of 0.3 mm in relation to the annular mounting surface.

11. A mounting structure for contacting a surface of a machine and holding a vibration sensor in relationship to the machine as vibration of the machine is measured by the vibration sensor, the mounting structure comprising:
- a sensor attachment portion for receiving and securely holding the vibration sensor;
- a base portion rigidly connected to the sensor attachment portion, the base portion comprising:
  - an annular mounting surface configured to contact the surface of the machine, the annular mounting surface having an outer radius R and an inner radius r;
  - a central recessed surface surrounded by the annular mounting surface, the central recessed surface recessed to a depth ranging from 0.2 mm to 0.4 mm in relation to the annular mounting surface; and
  - a central hole through the base portion for receiving a bolt or stud for attaching the mounting structure to the surface of the machine, wherein the value of the inner radius r is selected from a range of 8.9 mm to 9.1 mm and the value of the outer radius R is selected from a range of 12.3 mm to 12.5 mm, thereby causing the resonant frequency response of the mounting structure to be above a range of measurement frequencies in which the vibration sensor is used to measure vibration of the machine.

12. The mounting structure of claim 11 wherein the inner radius r is greater than or equal to 71% of the outer radius R and less than or equal to 75% of the outer radius R.

13. The mounting structure of claim 11 wherein the outer radius R is 12.4 mm and the inner radius r is 9.0 mm.

14. The mounting structure of claim 11 wherein the sensor attachment portion and the base portion are integrally formed as one continuous structure.

15. The mounting structure of claim 11 wherein the central hole has a radius that is less than the inner radius r of the annular mounting surface.

16. The mounting structure of claim 11 wherein the annular mounting surface is substantially flat.

17. The mounting structure of claim 11 wherein the annular mounting surface is defined as a portion of a surface of a toroid.

18. The mounting structure of claim 11 wherein the central recessed surface is recessed to a depth of 0.3 mm in relation to the annular mounting surface.

19. A mounting structure for contacting a surface of a machine and holding a vibration sensor in relationship to the machine as vibration of the machine is measured by the vibration sensor, the mounting structure comprising:
- a sensor attachment portion for receiving and securely holding the vibration sensor;
- a base portion rigidly connected to the sensor attachment portion, the base portion comprising:
  - an annular mounting surface configured to contact the surface of the machine, the annular mounting surface having an outer radius and an inner radius, wherein the inner radius is greater than or equal to 71% of the outer radius and less than or equal to 75% of the outer radius; and
  - a central recessed surface surrounded by the annular mounting surface, the central recessed surface configured not to contact the surface of the machine.

20. A mounting structure for contacting a surface of a machine and holding a vibration sensor in relationship to the machine as vibration of the machine is measured by the vibration sensor, the mounting structure comprising:
- a sensor attachment portion for receiving and securely holding the vibration sensor;
- a base portion rigidly connected to the sensor attachment portion, the base portion comprising:
  - an annular mounting surface configured to contact the surface of the machine, the annular mounting surface having an outer radius of 12.4 mm and an inner radius of 9.0 mm; and
  - a central recessed surface surrounded by the annular mounting surface, the central recessed surface configured not to contact the surface of the machine.

21. A mounting structure for contacting a surface of a machine and holding a vibration sensor in relationship to the machine as vibration of the machine is measured by the vibration sensor, the mounting structure comprising:
- a sensor attachment portion for receiving and securely holding the vibration sensor;
- a base portion rigidly connected to the sensor attachment portion, the base portion comprising:
  - an annular mounting surface configured to contact the surface of the machine, the annular mounting surface having an outer radius and an inner radius; and
  - a central recessed surface surrounded by the annular mounting surface, the central recessed surface configured not to contact the surface of the machine, wherein the central recessed surface is recessed to a depth ranging from 0.2 mm to 0.4 mm in relation to the annular mounting surface, wherein values of the inner radius and the outer radius are selected to have a predetermined effect on a resonant frequency response of the mounting structure.

* * * * *